United States Patent [19]

Brown

[11] Patent Number: 4,978,941
[45] Date of Patent: Dec. 18, 1990

[54] LOW TIRE PRESSURE DETECTOR

[75] Inventor: Daniel M. Brown, Grand Prairie, Tex.

[73] Assignee: Air Chex, Inc., Arlington, Tex.

[21] Appl. No.: 417,463

[22] Filed: Oct. 5, 1989

Related U.S. Application Data

[63] Continuation-in-part of Ser. No. 217,760, Jul. 11, 1988, abandoned.

[51] Int. Cl.5 .............................................. B60C 23/00
[52] U.S. Cl. .................................... 340/447; 340/442; 73/146.4; 73/146.5; 116/34 R; 200/61.22
[58] Field of Search ............... 340/447, 445, 446, 444, 340/442; 73/146.8, 146.2, 146.5, 146.4; 116/34 R, 34 A, 34 B; 200/61.22

[56] References Cited

U.S. PATENT DOCUMENTS

| | | |
|---|---|---|
| 2,948,256 | 8/1960 | Tapp . |
| 3,111,644 | 11/1963 | Froelich et al. . |
| 3,178,686 | 4/1965 | Mills .................................... 340/447 |
| 3,500,458 | 3/1970 | Cannalte . |
| 3,500,459 | 3/1970 | Battin . |
| 3,533,063 | 10/1970 | Garcia . |
| 3,697,944 | 10/1972 | Murano . |
| 3,713,092 | 1/1970 | Ivenbaum . |
| 3,787,806 | 1/1974 | Church . |
| 3,796,990 | 3/1974 | Hill . |
| 3,805,229 | 4/1974 | Murphy . |
| 3,810,090 | 5/1974 | Davis, Jr. et al. . |
| 3,835,451 | 9/1974 | Church . |
| 4,037,192 | 7/1977 | Cowit . |
| 4,048,614 | 9/1977 | Shumway . |
| 4,056,815 | 11/1977 | Anderson . |
| 4,059,823 | 11/1977 | Martin et al. . |
| 4,075,603 | 2/1978 | Snyder et al. ........................ 340/447 |
| 4,103,282 | 7/1978 | Cook . |
| 4,137,520 | 1/1979 | Deveau . |
| 4,160,234 | 7/1979 | Karbo et al. . |
| 4,186,377 | 1/1980 | Barabino . |
| 4,210,898 | 7/1980 | Betts . |
| 4,229,728 | 10/1980 | Tremba . |
| 4,237,728 | 12/1980 | Betts et al. . |
| 4,308,520 | 12/1981 | Darlington . |
| 4,311,985 | 1/1982 | Gee et al. . |
| 4,316,176 | 2/1982 | Gee et al. . |
| 4,334,215 | 6/1982 | Frazier . |
| 4,335,283 | 6/1982 | Migrin . |
| 4,384,482 | 5/1983 | Snyder . |
| 4,425,558 | 1/1984 | McConchie . |
| 4,426,637 | 1/1984 | Apple et al. . |
| 4,443,785 | 4/1984 | Speranza . |
| 4,468,650 | 8/1984 | Barbee ................................ 340/447 |
| 4,476,803 | 10/1984 | Malec . |
| 4,510,484 | 4/1985 | Snyder . |
| 4,644,317 | 2/1987 | Aingworth .......................... 340/447 |
| 4,694,273 | 9/1987 | Franchio ............................ 340/447 |

Primary Examiner—Donnie L. Crosland
Attorney, Agent, or Firm—James C. Fails; Geoffrey A. Mantooth

[57] ABSTRACT

A tire pressure monitoring system for vehicles characterized by a plurality of tire pressure sensors for sensing pneumatic pressure interiorly of the tire, a plurality of transmitters connected responsively with the tire pressure sensors and adapted to be energized when any one of the tire pressure sensors indicates a low pneumatic pressure within one of the tires; at least one receiver responsively disposed with respect to the transmitters so as to be energized by a transmitter when the transmitter is energized by the tire pressure sensor and a warning means, including a buzzer and a light, disposed in the operator's cab for conveying the warning to the operator when a low tire pressure is sensed, the warning means being electrically connected with the receiver, or receivers, so as to be energized when the receivers are energize. Also the transmitters are disposed at the central hub so as not to unbalance the wheel and sense each tire on a wheel, even when its a dual wheel at each location; and wherein a pair of receivers are disposed one at the back of a towing portion of an eighteen wheel truck and one at the back of a towed portion of an eighteen wheel truck so as to be responsive to the transmitters at each of the dual wheel monitors.

20 Claims, 6 Drawing Sheets

LOW TIRE PRESSURE DETECTOR

This application is a continuation-in-part of my application Ser. No. 217,760, filed July 11, 1988, now abandoned.

FIELD OF THE INVENTION

This invention relates to tire pressure detection, and more particularly, to a novel and improved tire pressure detector in which the operator of the vehicle is warned if one of the tires has a low pneumatic pressure interiorly thereof.

BACKGROUND OF THE INVENTION

The prior art is replete with a wide variety of approaches to monitoring and signaling vehicle tire pressure. The enclosed Information Disclosure Statement describes a large number of patents in this area ranging from the old Pat. No. 2,948,256 to Tapp through 4,510,484 to Snider. Several of these prior patents show a tire pressure indicator that is emplaced on the valve stem location. This is disadvantageous in that it tends to unbalance the tire and produce a signal that is subject to false alarms introduced by bounce or centrifugal force.

In others, tire pressure monitors are incorporated in vehicles having pneumatic tires to continuously or periodically measure air pressure within the tires and to alert the driver, or operator, should the pressure in one of the tires fall below a predetermined value and these have included units having self-contained batteries, transmitters affixed near the center of the wheel so as to minimize the unbalance introduced, periodic emission of pulses by the transmitter proportional to tire pressure such that these can be monitored and the like.

Consideration of the prior art shows the prior art has failed to produce the following features considered desirable and not heretofore made available.

(1) The tire pressure monitoring system should have a means for rejecting false alarms caused by bounce or centrifugal force;

(2) The tire pressure monitoring system should have a sensor remote from the tire itself not interiorly thereof;

(3) The tire pressure monitoring system should have a plurality of transmitters and receivers where each transmitter and receiver has its own battery. It is acceptable to operate the warning system off the truck electrical system, since the only time the operator would be monitoring the warning system would be when the truck was in operation. It is desirable that each transmitter and receiver have a means for testing the battery and conserve the battery as much as possible so that it operates only under a low tire pressure condition;

(4) There should be a connector and compatibility of components which allow changing between towing and towed vehicle components of the multi-wheel truck or the like;

(5) There should be a delay between sensing the low pressure and sounding the alarm in the cab in order that there be a safeguard against false alarms, whether from bounce, centrifugal force or passing another compatible vehicle; and finally, (6) There should be an indicator on the hub where the low tire pressure is sensed to facilitate locating the low tire by the operator of the vehicle once the operator has been given a warning.

SUMMARY OF THE INVENTION

Accordingly, it is an object of this invention to provide apparatus effecting one of the prior art advantageous features delineated hereinbefore and not heretofore provided.

It is another object of this invention to provide apparatus that effects potentially all of the features delineated as advantageous and not heretofore provided.

These and other objects will become apparent from the descriptive matter hereinafter, particularly when taken into conjunctions with the appended drawings.

In accordance with this invention there is provided a tire pressure monitoring system for detecting and warning an operator when a low tire pressure is encountered within a tire characterized by a plurality of tire pressure sensing means connected respectively interiorly of the tires for sensing pneumatic pressure within the tires, each tire pressure sensing means being in fluid communication with its respective tire and operable to sense the pneumatic pressure therewithin; a plurality of transmitters connected, respectively and responsively, with a plurality of the tire pressure sensing means and adapted to be energized when any one of the tire pressure sensing means indicates a low pressure within one of the tires; at least one receiver responsively disposed near enough to the transmitters to be responsive to the transmitter so as to be energized by one of the transmitters when any one of the transmitters is energized by its one tire pressure sensing means; and a warning means disposed in an operator's cab for conveying a warning to an operator when a low pressure is sensed within one of the tires. The warning means is electrically connected with the receiver so as to be energized when the receiver is energized.

In preferred embodiments, the transmitter and sensors are disposed adjacent a central hub so as not to unbalance the wheel on which it is disposed to sense the pressure within the tires associated with that wheel; and a plurality of receivers are disposed close enough to the transmitters to be energized when one of the transmitters signals the low tire pressure in one of the tires it is monitoring. This latter approach is advantageous in eighteen-wheel vehicles or the like wherein there is significant distance separating the wheels on which monitors are placed.

DESCRIPTION OF THE PREFERRED EMBODIMENTS

Figure 1:
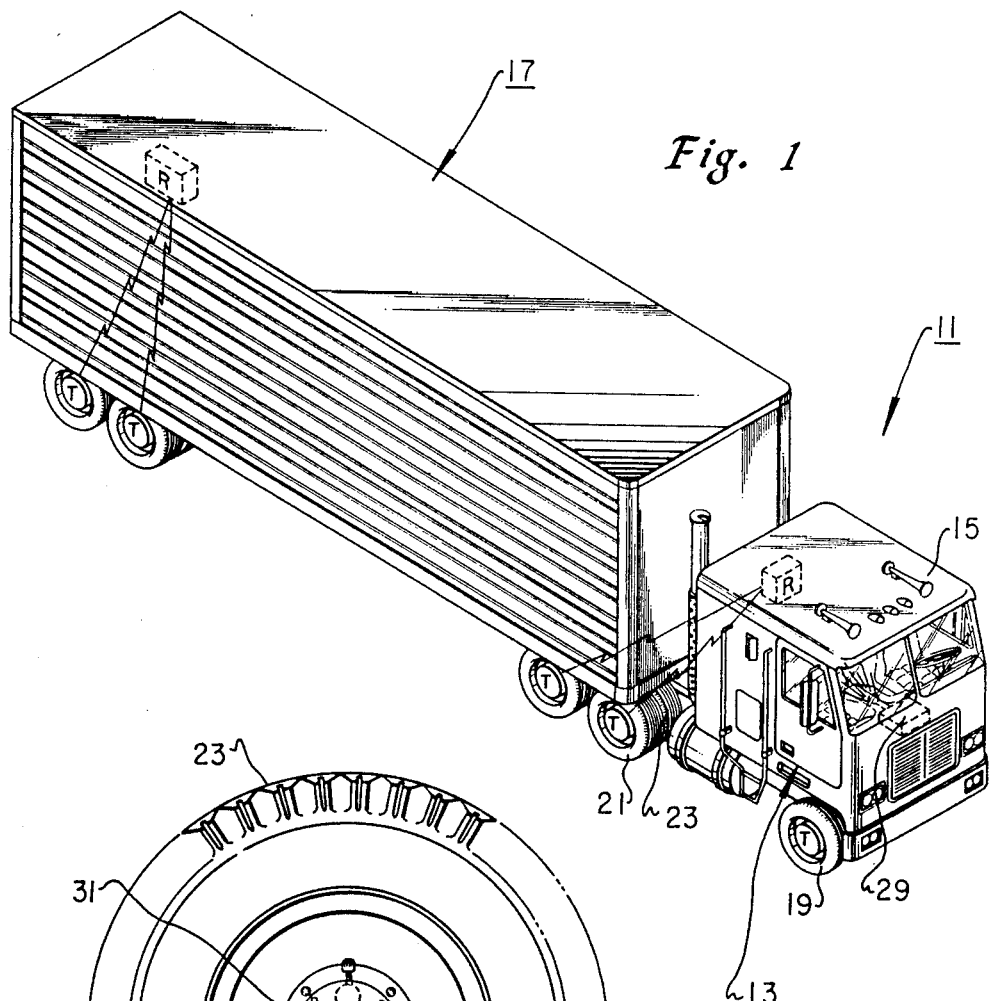
FIG. 1 is an isometric and somewhat schematic view of one embodiment of this invention used on a multi-wheeled truck.
Figure 2:
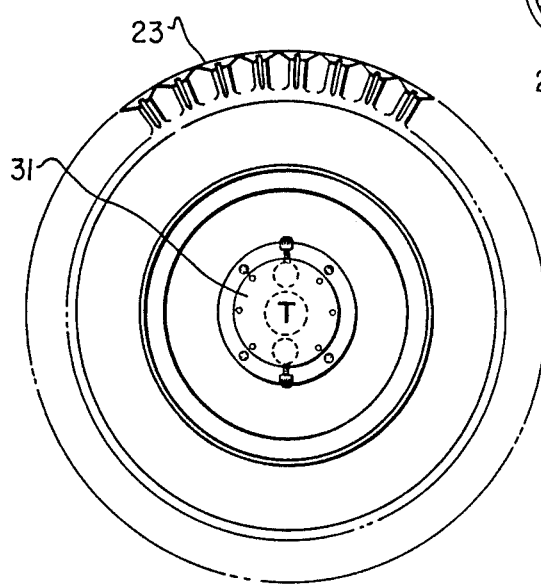
FIG. 2 is a front elevational view of a transmitter disc located at the hub of a wheel so as not to introduce unbalance.

Referring to FIG. 1, there is illustrated a so-called 18-wheeler, or a multi-segmented truck 11 in which there is a towing portion 13 having a cab 15 and a towed portion 17. This type of vehicle is well known and need not be described in great detail. It is sufficient to note that ordinarily it will have a pair of steerable front wheels 19 and the remainder of the wheels 21 will be duals, which means that they have two tires 23 on each set of dual wheels. It is in this type of vehicle that the problem which this invention is designed to solve is most acute so it is in this context that this invention will be described hereinafter. It should be born in mind however, that the invention can be employed to monitor tires on singly mounted tires and wheel if desired. In such singly mounted tires, there is usually not a big problem associated with loss of pneumatic pressure within one of the tires without knowledge of the operator.

Figure 9:
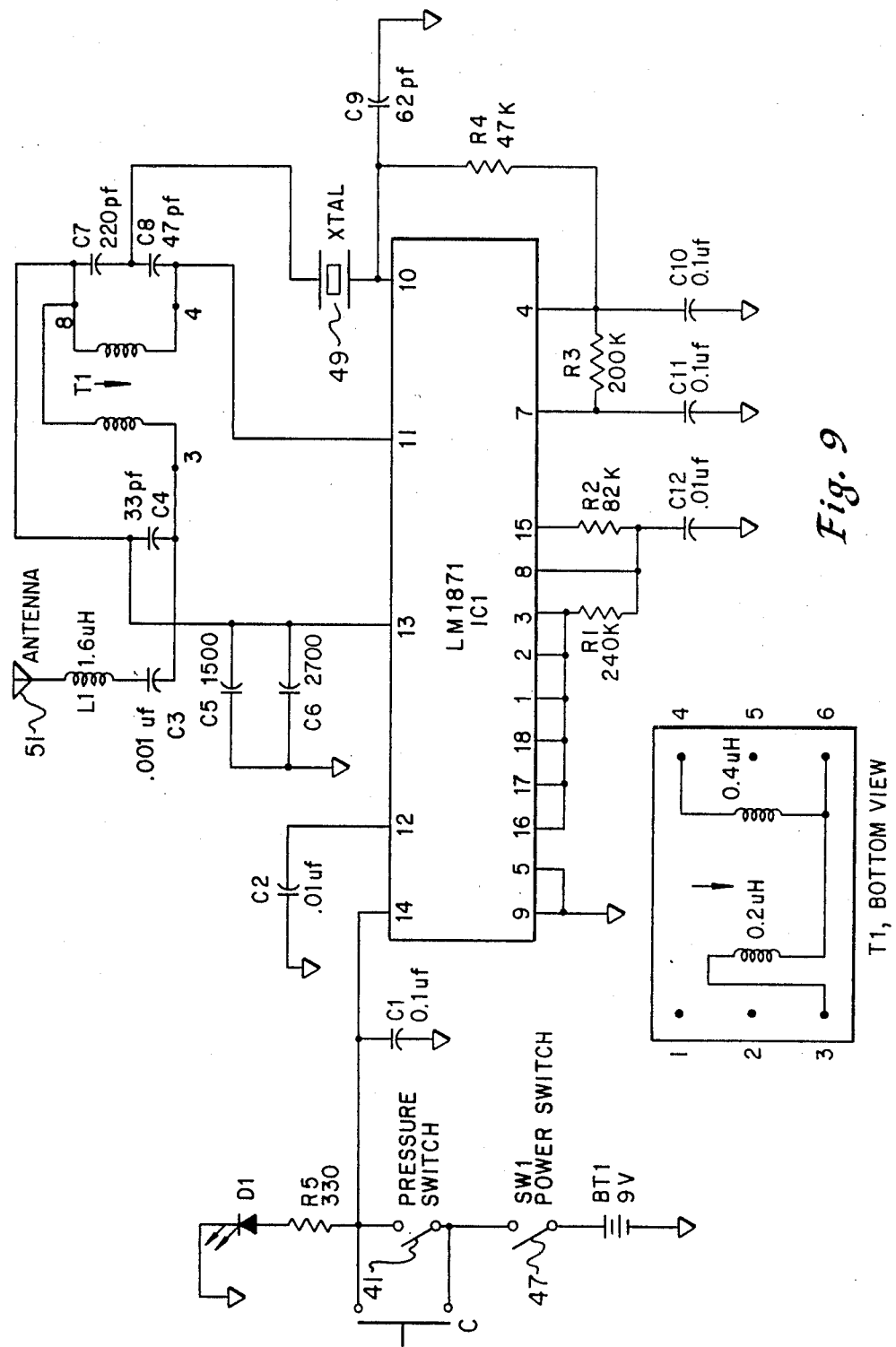
FIG. 9 is a schematic illustration of the electronic circuitry employed in the remote control transmitter.
Figure 10:
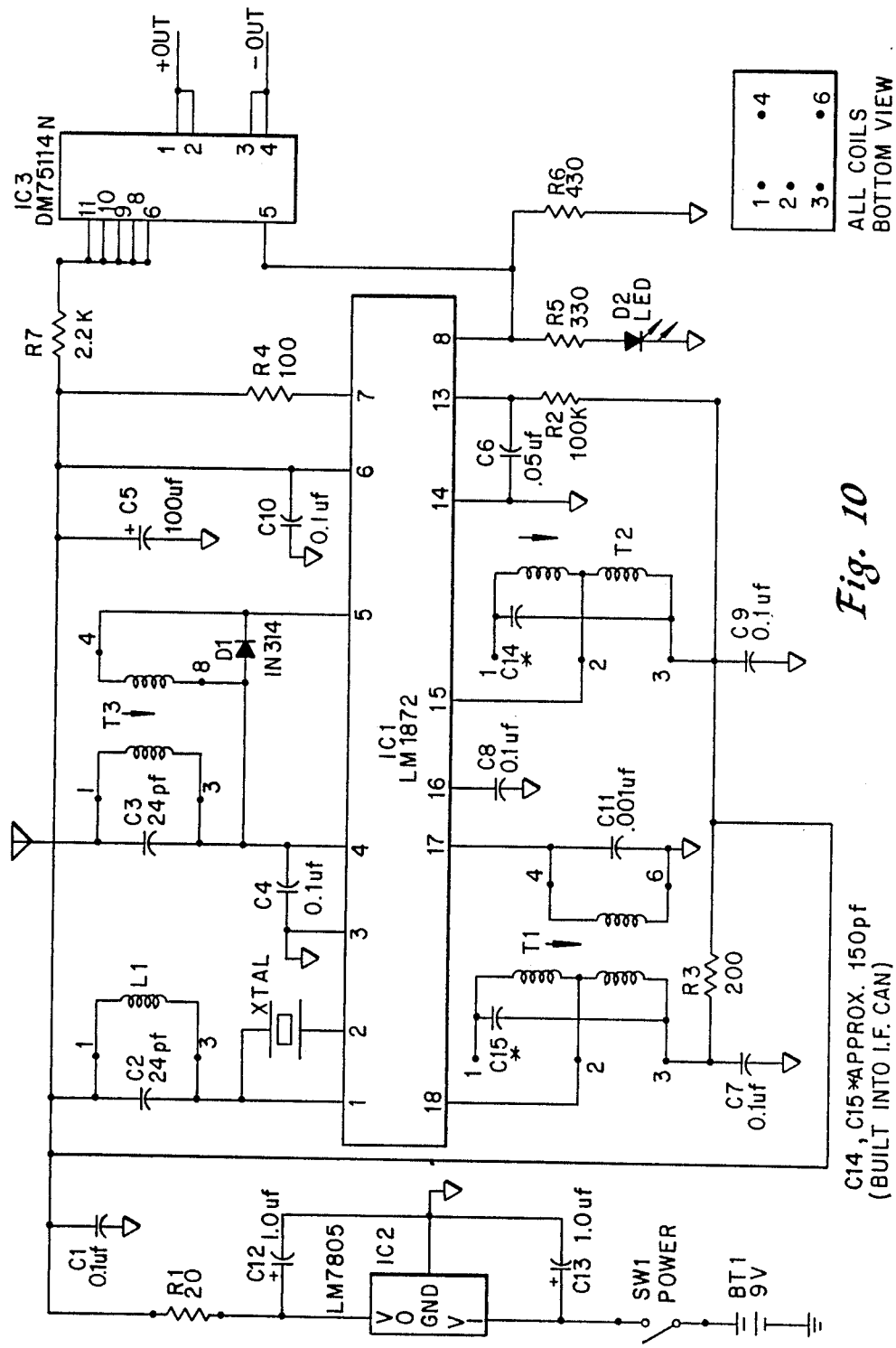
FIG. 10 is a schematic illustration of the remote control receiver circuit.
Figure 11:
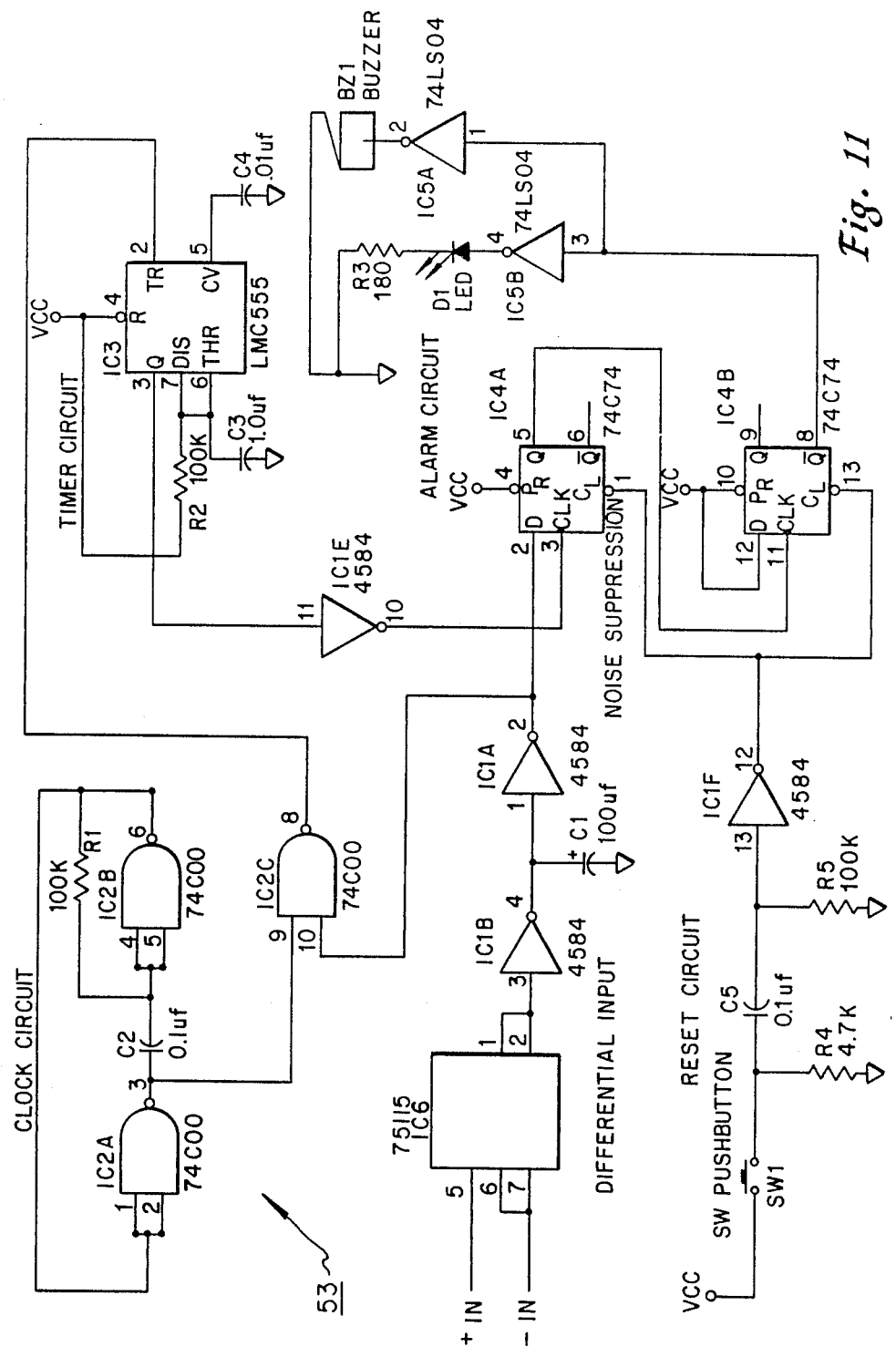
FIG. 11 is a schematic illustration of the alarm, or warning means, circuit.

Referring to the Figs., the tire pressure monitoring system 25 includes: a plurality of tire pressure sending means 27, FIGS. 2, and 4-7; a plurality of transmitters T, FIGS. 1, 2, 4-7, 9; at least one and preferably a plurality of receivers, R, FIGS. 1, 10, close enough to the transmitters to be energized thereby; and a warning means 29, FIGS. 1, 11.

Figure 3:
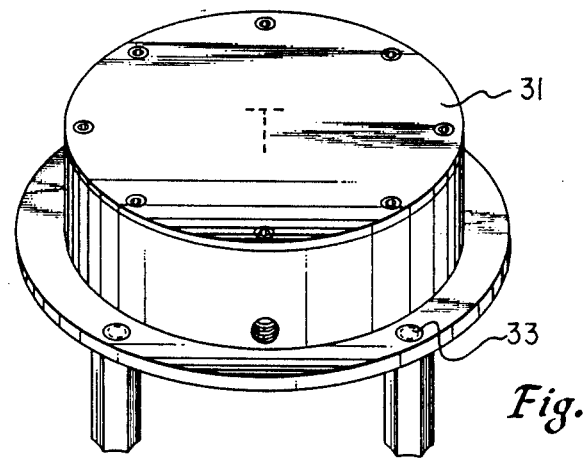
FIG. 3 is an isometric view of the mechanical assembly of the transmitter and pressure sensing means which is emplaced adjacent the hub of the wheel on which it is to monitor the tires.

As can be seen in FIG. 1, the tire pressure monitoring system 25 is scattered throughout the vehicle ranging from the warning system 29 in the cab to the respective receivers R, transmitters T and tire pressure sensing means 27. As can be seen, the main assembly 31, including the transmitter, is disposed in line with a hub that is at the radial center of the tire 23, FIG. 2. Assembly 31 can be seen more nearly completely in FIG. 3. The stud marked A on FIG. 3 is a spacer between the top of a special lug nut which accepts the spacer. The device 31 is attached to the spacer with a one-fourth inch flat head screw 33. This is required to allow attaching the device to different cab drive wheel configurations (not shown). Different configurations require different length spacers. Attachment to the aft wheel of the towed portion requires appropriate attachment devices, (not shown), as the wheel hub section is frequently tapered and may need a clamping system for attachment of the device.

The tire pressure sensing means 27 is illustrated in FIGS. 4-8. As illustrated in FIGS. 5-8, the tire pressure sensing means includes a spring 35 interiorly of which is emplaced a threaded stud 37 that has disposed at its top a nut 39. The nut 39 keeps a limit switch 41 depressed until the nut is allowed to move downwardly to free the limit switch. The limit switch then comes on and signals the low tire pressure.

As noted in the first feature on page 1, the tire pressure monitoring system should have means for rejecting false alarm calls by bounce or centrifugal force; or otherwise be immune to such false signals. To obtain this result, and as illustrated in the Figs., the tire pressure sensing means 27 is perpendicular to the plane of the wheel, or tire, it is monitoring; and consequently, it is perpendicular to the plane of any shock force such a defect in the road; for example, (a) "chuck hole" in the pavement on which the wheel rolls.

Specifically, the limit switch 41 is the pressure switch 41 shown in FIG. 9 which turns on the transmitter T.

Each transmitter is formed from conventional units such as National Semiconductor chips that are connected together in a conventional transmitter circuit, such as described in National Semiconductor Handbook which is a publication that is available to any buyer of the National Semiconductor chips, as well as to the public generally.

Each transmitter is emplaced in a transmitter cavity 43, FIGS. 4-7, in its respective assembly 31.

Figure 4:
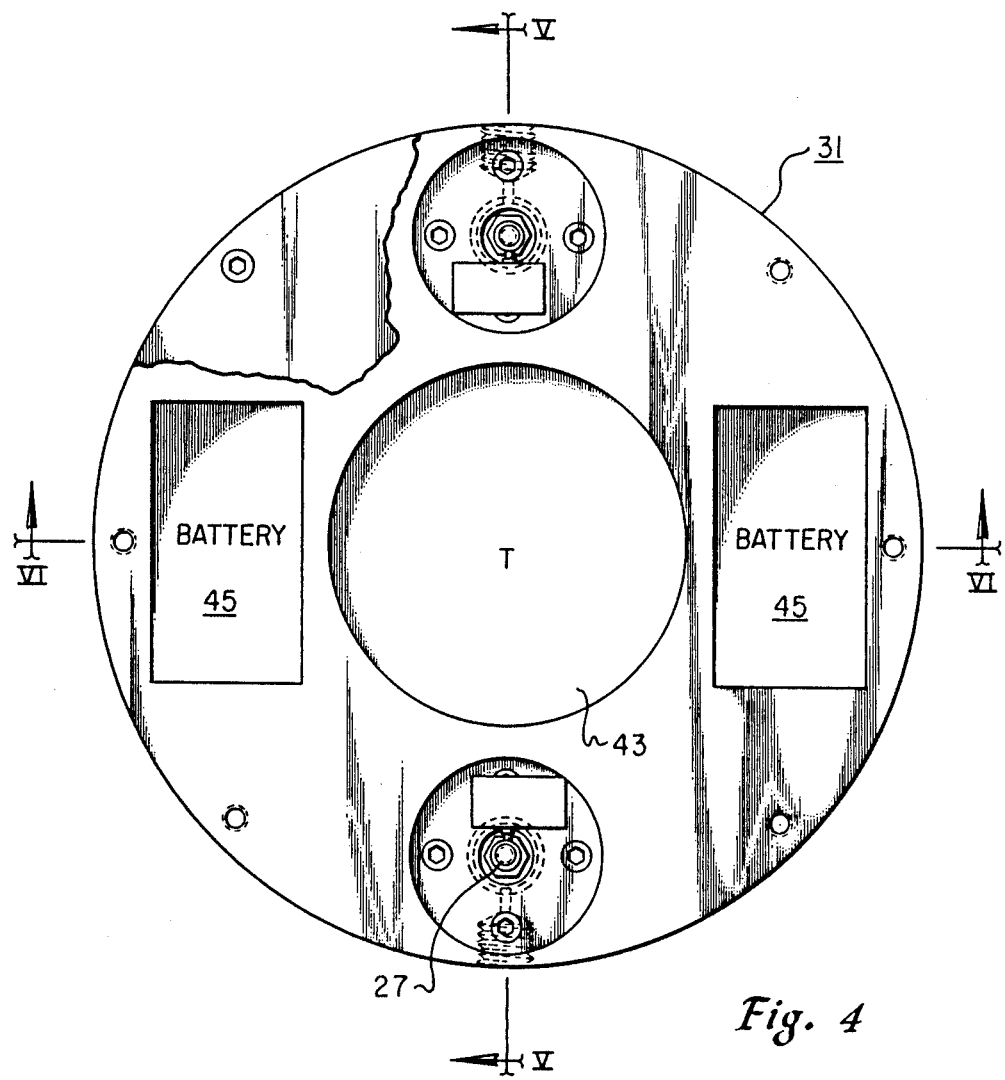
FIG. 4 is a plan view of the mechanical assembly of FIG. 3.
Figure 5:
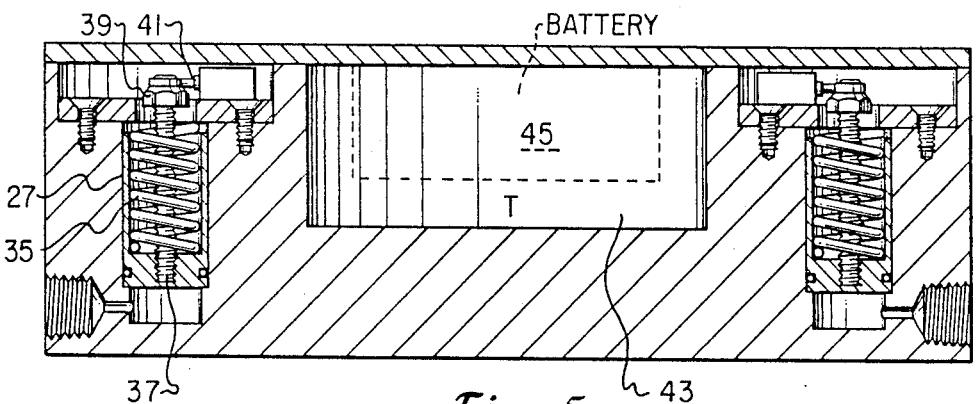
FIG. 5 is a side elevational view of the embodiment of FIG. 4.
Figure 6:
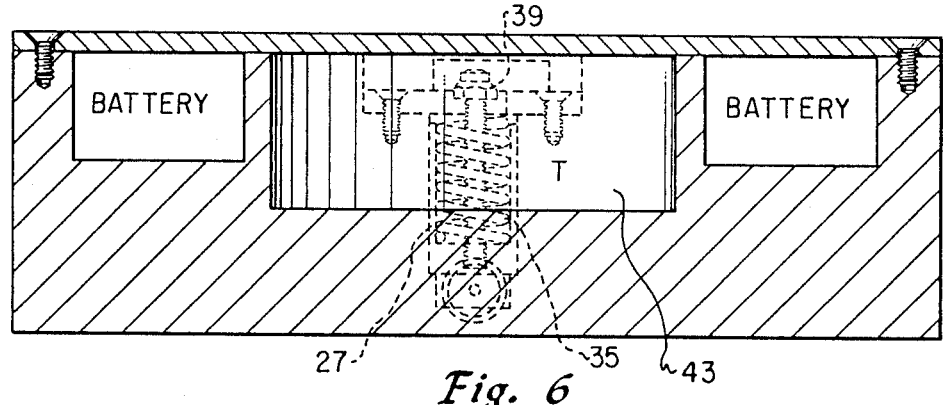
FIG. 6 is an end view of the embodiment of FIG. 4.
Figure 7:
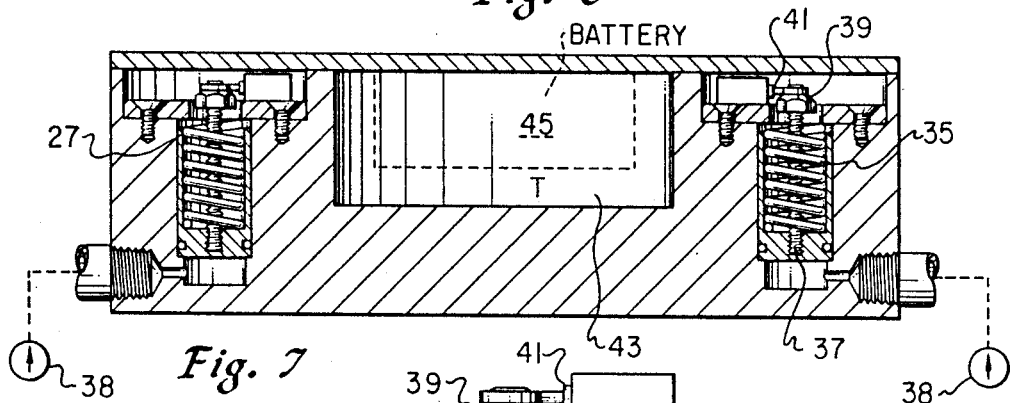
FIG. 7 is a side view of the embodiment of FIG. 4, with gauges shown schematically.
Figure 8:
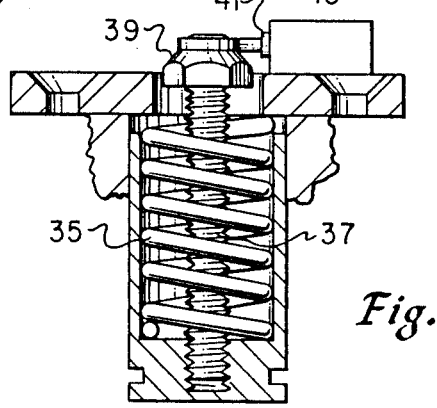
FIG. 8 is a partial cross-sectional view showing the sensor of this invention.

Each transmitter has its own battery which is emplaced in the battery cavity 45, FIGS. 4-5 and 7. In fact, as illustrated in FIG. 4, there will be a pair of batteries connected in parallel in respective battery cavities for monitoring each tire such that there may be two nine volt batteries respectively in each of the assemblies 31 having a respective transmitter T.

The documentation for the use of the LM 1871 National Semiconductor chip begins on page 9-101 of the National Semiconductor Handbook and discusses the respective interconnections of the LM 1871 chip. Table I illustrates a remote transmitter parts list.

TABLE I

| Item | Quantity | Reference | Part |
|---|---|---|---|
| 1 | 1 | R1 | 240K |
| 2 | 1 | R2 | 82K |
| 3 | 2 | C12,C2 | .01uf |
| 4 | 3 | C1,C10,C11 | 0.1uf |
| 5 | 1 | PRESSURE | SWITCH |
| 6 | 1 | C3 | .001uf |
| 7 | 1 | C5 | 1500 |
| 8 | 1 | C6 | 2700 |
| 9 | 1 | C4 | 33pf |
| 10 | 1 | C7 | 220pf |
| 11 | 1 | C8 | 47pf |
| 12 | 1 | R3 | 200k |
| 13 | 1 | C9 | 62pf |
| 14 | 1 | R4 | 47K |
| 15 | 1 | BT1 | 9V |
| 16 | 1 | D1 | LED |
| 17 | 1 | R5 | 330 |
| 18 | 1 | SW1 | POWER SWITCH |
| 19 | 1 | IC1 | LM1871 |
| 20 | 1 | T1 | TOKO K4635BJE TRANSFORMER |
| 21 | 1 | L1 | 1.6uH RF CHOKE |
| 22 | 1 | XTAL | 49.890 MHz |

Referring to FIG. 9, the D1 or light emitting diodes which are energized when (1) the pressure switch 41, FIG. 9 is activated, allowing the operator to determine which transmitter is active when low pressure occurs, or when (2) switch C of FIG. 9 is pushed to turn on to test transmitter and receiver circuits. SW1, switch 47, FIG. 9, is used to activate the battery only. This unit does not use the vehicle power although such direct current power source could be employed with appropriate design.

Still referring to FIG. 9, the capacitor C1 is a 0.1 microfarad capacitor which is a filter capacitor. The capacitor C2 is a 0.01 microfarad capacitor going to pin 12 on the 1871 chip. These are discussed in greater detail in the connection illustrated and described in the National Semiconductor Handbook; for example, at 9-105. It is sufficient to note that after the master power switch 47 is turned on, all that is required to energize a transmitter is for a pressure switch 41 to be turned on, as by low tire pressure. When this happens, the crystal 49, FIG. 9, is caused to transmit to the antenna 51 suitable transmission signal for energizing the receiver, illustrated in FIG. 10. There is a limited range of transmission from the transmitter to receiver, ordinarily this is in the range of ten to twelve feet although there have been known instances where it can be transmitted and received at distances up to eighteen feet. Consequently, the receiver R is placed within about ten to twelve feet to each of the transmitters that should energize that particular receiver.

It should be emphasized that all the elements are compatible on a given setup employing this invention. Expressed otherwise, any cab can be used with any trailer and all that is necessary to interconnect the connector between the alarm system in the cab and the particular receiver or receivers.

The main chip employed in the remote control receiver is the LM 1872 which is a radio controlled receiver decoder and it is discussed in the National Semiconductor Handbook beginning on page 9-116 through 9-104.

As with the transmitter, the receiver R is formed by connecting together respective National Semiconductor chips and components as illustrated in the discussion of the LM 1872 in forming a radio controlled receiver/decoder. Of course, any type receiver/decoder could be employed and a man of the average skill in the art could come up with a substitute receiver as desired. Expressed otherwise, the invention in this invention does not lie with the transmitter or receiver since they are formed with conventional component parts conventionally connected.

The warning system circuit, or alarm schematic is illustrated in FIG. 11. Table II is a parts list for the warning means, or system.

TABLE II

| Item | Quantity | Reference | Part |
|---|---|---|---|
| 1 | 1 | IC2 | 74C00 |
| 2 | 1 | IC1 | 4584 |
| 3 | 1 | IC3 | LMC555 |
| 4 | 2 | IC5,1C5 | 74LS04 |
| 5 | 1 | IC4 | 74C74 |
| 6 | 1 | R1 | 100K ohm |
| 7 | 1 | C1 | 100 uf |
| 8 | 1 | C3 | 1.0 uf |
| 9 | 1 | C4 | .01 uf |
| 10 | 2 | R2,R5 | 100K |
| 11 | 1 | BZ1 | BUZZER |
| 12 | 1 | D1 | LED |
| 13 | 1 | R3 | 180 |
| 14 | 1 | SW1 | SW PUSHBUTTON |
| 15 | 1 | R4 | 4.7K |
| 16 | 2 | C2,C5 | 0.1 uf |
| 17 | 1 | IC6 | DM75115N |

In the upper left hand corner of FIG. 11 is a multivibrator 53 that operates at 1,000 Hertz (Hz) as a flip-flop clocking circuit. This gives a time delay such that false signals; such as passage of another vehicle with a flat tire signal; will not automatically energize the alarm circuit unless the signal persists throughout the time delay. Once the time signal times out, if the signal persists at the IC1A, the signal is sent to the alarm circuit. The interval of time for which the timer can be set is from one to five seconds. The inverter IC1E then allows a buzzer to sound and the light to come on by way of the timer circuit interfacing with the clock and noise suppression. As can be seen in FIG. 11, and as noted in claim 1, the alarm circuit is energized when the receiver is energized.

In the lower left hand corner there is a reset circuit that allows a push button to reset the circuit in the event there is a false signal.

At the right hand side there is a D1 LED, affording visual indication of low pressure, or high signal. If the high signal persists throughout the time interval, whenever it is set, there is a low tire signal on and the buzzer and light go on and remain on until the reset circuit is energized.

FIG. 7 illustrates a pressure gauge 38 schematically. Such pressure gauges are heavy and expensive to use and so are not ordinarily desirable. A valve stem could be located at this point and employed to test the pressure with a conventional tire gauge for each of the respective tires on a dual-tired wheel. Such a tire stem would also allow a point of entry for inflating and deflating a tire on a wheel.

In the prior art, when a particular cab was employed to transport a particular trailer, the programmer or operator or the like had to program the respective receivers to the respective decoding apparatus in order to enable operation of the particular detectors on a particular trailer. One of the advantages of this invention is that this is not necessary.

The materials of construction of this invention may be those ordinarily employed in this art. For example, as illustrated in the prior art, high impact organic polymer materials are frequently employed, these include such thermoplastic materials as polyethylene, polypropylene, polyvinylidine chloride, polystyrene, polyvinyl chloride, polytetrafluroethylene, acrylonitrile-butadiene-styrene terpolymer, polyphenylene sulfide, polyethyleneterephthalate, polychlorotrifluoroethylenes, polyamides, melamines formaldehydes, polyphenalines, poly Nylons and combinations thereof Particularly preferred are polymers having good moisture and vapor barrier properties. The polymer resins may optionally be filled with suitable fibers such as graphite fiberglass, fibercarbon, fiberboron, fiberaramine, (polyamide fiber) and the like. The pressure detector parts may be molded or machined as will be apparent to those skilled in the art.

Conventional design criteria in designing the circuits, as well as preventing interference under suitable FCC regulations pertaining to vehicles under the Department of Transportation Regulations will be observed.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. A tire pressure monitoring system for a vehicle having a plurality of tires and having an operator's cab comprising:

a. a plurality of tire pressure sensing means for sensing pneumatic pressure within said tires; each of said tire pressure sensing means being in communication with its respective tire and operable to sense the pneumatic pressure therewithin; said tire pressure sensing means being perpendicular to the plane of said tire such that it is insensitive to false alarms such as bounce or centrifugal force by said tire;

b. a plurality of transmitters connected, respectively and responsively with a plurality of said tire pressure sensing means, and adapted to be energized when any one of said tire pressure sensing means indicates a low pneumatic pressure within one of the tires;

c. at least one receiver responsively disposed near enough to said transmitters to be responsive to said transmitters so as to be energized by said transmitters when one of said transmitters is energized by its one tire pressure sensing means; and d. a warning means disposed in the operator's cab for conveying a warning to an operator when a low pressure is sensed within one of said tires; said warning means being electrically connected with said receiver so as to be energized when said receiver is energized.

2. The tire pressure monitoring system of claim 1 wherein each of said transmitter is centrally disposed with respect to the periphery of the one wheel it is supposed to monitor.

3. The tire pressure monitoring system of claim 1 wherein the vehicle is a multiple wheeled truck and a plurality of said wheels are dual wheels having two tires mounted to a centrally disposed rotatable hub and each of said transmitter is mounted in alignment with said centrally disposed hub so as not to induce unbalance to said wheel.

4. The tire pressure monitoring system of claim 3 wherein each transmitter at each dual wheel location has a plurality of inlet transducers that are sensitive to pneumatic pressure and are sealingly connected in communication with the interior of a respective tire of the pair of tires for each of said dual wheels.

5. The tire pressure monitoring system of claim 4 wherein said vehicle is an eighteen-wheel truck having a towing portion and a towed portion with a plurality of dual wheels at at least the rear of said towing portion and at least one pair of dual wheels at the rear of said towed portion and wherein there is provided a transmitter centrally disposed at the radial interior, or center hub of each dual wheel location and wherein there is provided a plurality of receivers at least one receiver being within eighteen feet and within the transmitter range of each transmitter it is to monitor; whereby any one of said transmitters can operably energize at least one of said receivers and all said receivers are electrically connected with said warning means of said cab.

6. The tire pressure monitoring system of claim 1 wherein said tire pressure sensing means comprises a pneumatically responsive piston, spring, threaded shaft, nut and limit switch such that when the tire pressure is adequate the nut is in proper position to prevent operation of the limit switch but when the tire pressure is low, the nut falls down and allows operation of the limit switch.

7. The tire pressure monitoring system of claim 6 wherein a pressure gauge is in fluid communication with the pressure interiorly within the tire and to which the sensing means is subjected.

8. The tire pressure monitoring system of claim 1 wherein said warning means is hardwired with said receiver and wherein an electrical interconnector is provided between a towed portion of a vehicle and a towing portion of a vehicle.

9. An apparatus for detecting low pressure in a vehicle tire, said tire lying in a plane, comprising:

(a) a piston slidingly disposed in an assembly, said piston having two sides, one of said piston sides being adapted to be in communication with air located inside of said tire, the other of said piston sides being in contact with spring means, wherein said spring means pushes said piston when a predetermined low pressure is applied to said one side of said piston;

(b) switch means disposed in said assembly and located adjacent to said piston so as to be actuated when said spring means pushes said piston due to low air pressure;

(c) a transmitter being electrically connected to said switch means, said transmitter being located in said assembly and being powered by a battery in said assembly, wherein said switch means energizes said transmitter when said spring means pushes said piston due to low air pressure;

(d) said assembly being adapted to be coupled to said tire such that said piston moves in a direction that is perpendicular to the plane of said tire, said assembly being centrally disposed to said tire, wherein the orientation of said piston reduces false low pressure alarms.

10. An apparatus for detecting low pressure in vehicle tires, each of said tires lying in a plane, comprising:

(a) a plurality of sensing assemblies, each of said assemblies having a piston slidingly disposed therein, said piston having two sides, one of said piston sides being adapted to be in communication with air located within the respective tire, the other of said piston sides being in contact with respective spring means, wherein said respective spring means pushes said respective piston when a predetermined low pressure is applied to said one side of said piston;

(b) each of said assemblies have a switch means disposed therein, said respective switch means being located adjacent to said respective piston so as to be actuated when said spring means pushes said piston due to low air pressure;

(c) each of said assemblies having a transmitter that is electrically connected to said switch means, said transmitter being powered by a battery in said assembly, wherein said switch means energizes said transmitter when said spring means pushes to said piston due to low air pressure;

(d) each of said assemblies being coupled to a tire such that said respective piston moves in a direction that is perpendicular to the plane in said respective tire, each of said assemblies being centrally disposed on said respective tires;

(e) a receiver located on said vehicle so as to be near said transmitters so that said receiver can receive a signal produced by said transmitters;

(f) warning means for warning of a low tire condition, said warning means being located in a cab of said vehicle and being electrically connected with said receiver, said warning means having indicating means that is operated when said receiver receives a signal from one of said transmitters.

11. The apparatus of claim 10, wherein said vehicle has sets of dual tires, with said dual tires being located adjacent to each other, wherein each of said assemblies that is coupled to a set of dual tires has two pistons, one for each tire, each of said pistons actuating a respective switch means that is connected to a transmitter, said pistons being oriented perpendicularly to the plane of said respective tires.

12. The apparatus of claim 10 wherein each of said transmitters comprises tire indicator means for indicating a low pressure condition.

13. The apparatus of claim 10, wherein each of said transmitters comprises test switch means for selectively operating said respective transmitter for test purposes.

14. The apparatus of claim 10, wherein:
   (a) said vehicle has sets of dual tires, each set of dual tires having two tires that are located adjacent to each other, wherein each of said assemblies that is coupled to a set of dual tires has two pistons, one for each tire, each of said pistons actuating a respective switch means that is connected to a transmitter, said pistons being oriented perpendicularly to the plane of said respective tires;
   (b) each of said transmitters comprises tire indicator means for indicating a low pressure condition, said tire indicator means comprising a light source;
   (c) each of transmitters comprises test switch means for selectively operating said respective transmitter for test purposes.

15. The apparatus of claim 10 wherein said vehicle is an 18- wheeled truck, there being a receiver located at the aft portion of the truck and a receiver located at the forward portion of the truck, with both of said receivers being connected to said warning means, wherein the distance between the transmitters and the receives is minimized.

16. The apparatus of claim 10 wherein said warning means comprises delay means for delaying the operation of said indicating means for a predetermined period of time during the application of a signal from said receiver to said warning means, wherein said delay means prevents said indicating means from being operated by false signals of short duration.

17. The apparatus of claim 10, wherein said warning means comprises reset means for resetting said indicating means, wherein said indicating means can be reset when operating to determine if a false signal is present a t said warning means.

18. The apparatus of claim 10, wherein:
   (a) said vehicle is an 18-wheeled truck, there being a receiver located at the aft portion of the truck and a receiver located at the forward portion of the truck, with both of said receivers being connected to said warning means, wherein the distance between the transmitters and the receives is minimized;
   (b) said warning means comprises delay means for delaying the operation of said indicating means for a predetermined period of time during the application of a signal from one of said receivers to said warning means, wherein said delay means prevents said indicating means from being operated by false signals of short duration;
   (c) said warning means comprises reset means for resetting said indicating means, wherein said indicating means can be reset when operating to determine if a false signal is present at said warning means.

19. The apparatus of claim 10 wherein said piston has a threaded shaft with a nut located thereon, said switch means comprising a limit switch that is kept depressed by contacting said nut until said piston is pushed by said spring means due to low pressure, wherein said limit switch becomes closed and energizes said transmitter.

20. The apparatus of claim 10, wherein:
   (a) said vehicle has sets of dual tires, each set of dual tires having two tires that are located adjacent to each other, wherein each of said assemblies that is coupled to a set of dual tires has two pistons, one for each tire, each of said pistons actuating a respective switch means that is connected to a transmitter, siad pistons being oriented perpendicularly to the plane of said respective tires;
   (b) each of said transmitters comprises tire indicator means for indicating a low pressure condition, said tire indicator means comprising a light source;
   (c) each of transmitters comprises test switch means for selectively operating said respective transmitter for test purposes;
   (d) said vehicle is an 18-wheeled truck, there being a receiver located at the aft portion of the truck and a receiver located at the forward portion of the truck, with both of said receivers being connected to said warning means, wherein the distance between the transmitters and the receivers is minimized;
   (e) said warning means comprises delay means for delaying the operation of said indicating means for a predetermined period of time during the application of a signal from one of said receivers to said warning means, wherein said delay means prevents said indicating means from being operated by false signals of short duration;
   (f) said warning means comprises reset means for resetting said indicating means, wherein said indicating means can be reset when operating to determined if a false signal is present at said warning means;
   (g) said piston has a threaded shaft with a nut located thereon, said switch means comprising a limit switch that is kept depressed by contacting said nut until said piston is pushed by said spring means due to low pressure, wherein said limit switch become closed and energizes said transmitter.

* * * * *